(12) United States Patent
Wu et al.

(10) Patent No.: US 8,082,356 B2
(45) Date of Patent: Dec. 20, 2011

(54) SYNCHRONIZING BUFFER MAP OFFSET IN PEER-TO-PEER LIVE MEDIA STREAMING SYSTEMS

(75) Inventors: Kang Heng Wu, Yunfu (CN); Chun Yin Ng, Hong Kong (CN); Liang Qiao Chen, Shenzhen (CN); Tak Wing Lam, Hong Kong (CN)

(73) Assignee: Hong Kong Applied Science and Technology Research Institute Co., Ltd., Hong Kong (CN)

( * ) Notice: Subject to any disclaimer, the term of this patent is extended or adjusted under 35 U.S.C. 154(b) by 453 days.

(21) Appl. No.: 12/331,162

(22) Filed: Dec. 9, 2008

(65) Prior Publication Data

US 2010/0146137 A1 Jun. 10, 2010

(51) Int. Cl.
G06F 15/16 (2006.01)
G06F 15/167 (2006.01)
G06F 15/173 (2006.01)

(52) U.S. Cl. ......... 709/231; 709/213; 709/243; 709/248

(58) Field of Classification Search .................. None
See application file for complete search history.

(56) References Cited

U.S. PATENT DOCUMENTS

| 7,672,235 | B1 * | 3/2010 | Lian et al. ................ 370/230 |
| 2007/0094405 | A1 | 4/2007 | Zhang |
| 2008/0037527 | A1 | 2/2008 | Chan et al. |
| 2008/0112315 | A1 | 5/2008 | Hu et al. |
| 2008/0140853 | A1 | 6/2008 | Harrison |
| 2008/0155120 | A1 | 6/2008 | Argawal et al. |
| 2010/0146136 | A1 * | 6/2010 | Lou et al. ................ 709/231 |
| 2010/0146138 | A1 * | 6/2010 | Ng et al. ................ 709/231 |

OTHER PUBLICATIONS

Li, Chunxi et al., "Initial Offset Placement in P2P Live Streaming Systems," arXiv:0810.2063v1 [cs.MM], Oct. 12, 2008.

* cited by examiner

*Primary Examiner* — John B. Walsh
(74) *Attorney, Agent, or Firm* — Fulbright & Jaworski L.L.P.

(57) ABSTRACT

A method performed by a new joining peer device in a peer-to-peer (P2P) network comprises receiving a plurality of buffer maps, each of the received buffer maps associated with a respective other peer device in the P2P network. The method also includes discerning playback positions associated with the received buffer maps, generating a starting offset for the new joining peer using one or more of the discerned playback positions. Requests for portions of a media stream are scheduled in accordance with the starting offset, and the scheduler will build a buffer map from this offset and begin to request the media buffer.

20 Claims, 7 Drawing Sheets

| CHUNK ID | 80 | 81 | 82 | 83 | 84 | 85 | 86 | 87 | 88 | 89 | 90 | 91 | 92 | 93 | 94 | 95 |
|---|---|---|---|---|---|---|---|---|---|---|---|---|---|---|---|---|
| BITMAP | 1 | 1 | 1 | 1 | 1 | 1 | 1 | 1 | 0 | 0 | 0 | 0 | 1 | 0 | 1 | 0 |

BUFFER OFFSET → 80
PLAY OFFSET → 84

SYNCHRONIZING BUFFER MAP OFFSET IN PEER-TO-PEER LIVE MEDIA STREAMING SYSTEMS

TECHNICAL FIELD OF THE INVENTION

The present description relates, in general, to Peer-to-Peer (P2P) networks and, more specifically, to generating buffer map offsets in peer devices.

BACKGROUND OF THE INVENTION

FIG. 1 is an illustration of conventional P2P network 100. Network 100 includes source peer 101, receiving peers 102-108, and tracker server 110. In one example, receiving peer 108 is joining network 110 and begins the process by requesting information from tracker server 110. Specifically, peer 108 asks tracker server 110 for a list of neighboring peers that are sharing a particular stream, which source peer 101 provides. The list of neighboring peers generally includes other peer devices in P2P network 100 and may include some or all of peers 101-107.

Once receiving peer 108 receives the list of neighboring peers, it requests buffer maps from those neighboring peers. A buffer map is a set of data that generally conforms to the following format: <buffer offset, play offset, bitmap>. A given peer's buffer can generally be thought of as a memory that stores the received portions of the stream. The portions are numbered sequentially, and a portion's number serves as its identifier. A peer will typically request and save portions of the stream for some amount of time before the portions are played in order to provide a smooth and continuous playback for the user. The buffer also will typically keep portions of the stream that have been played for a certain amount of time in case other peers request the played portions. As additional portions are received, older portions can be dropped.

FIG. 2 is a conceptual representation of buffer map 200, which may be used by peers in conventional P2P network 100. For example, peer 108 may receive buffer map 200 from peer 102. When received, buffer map 200 takes the form <80,84, 1111 1111 0000 1010>. As shown, the buffer offset is 80, which identifies the portion of the stream where the buffer begins (i.e., the earliest-in-time portion that is currently buffered by the peer that sent buffer map 200). The playback offset is 84, which identifies the portion currently playing by the peer that sent buffer map 200. Bitmap 201 is a set of ones and zeros where a one indicates that the particular portion of the stream is currently buffered, and a zero indicates that the particular portion has not been received.

Returning to FIG. 1, peer 108 requests buffer maps from its neighboring peers and receives buffer maps in the format described above. It is generally expected that various peers receiving the same stream have varying buffer maps with different buffer offsets, play offsets, and bitmaps. Peer 108 "knows" which portions of the stream are available from each of its neighbors by examining the contents of the received buffer maps. Peer 108 then begins requesting portions of the stream from one or more of its neighboring peers and creating its own buffer.

An issue that arises in P2P network 100 is that if peer 108 begins requesting the stream beginning at the very latest portions, it may send many requests to source peer 101, thereby overloading source peer 101. On the other hand, if peer 108 begins requesting the stream at portions that are older, then the viewer of peer 108 sees a significantly time-delayed version of the stream (which may be unappealing for some live streams, such as for sports events). There is currently no satisfactory technique for selecting a starting offset for a peer device in a P2P network.

BRIEF SUMMARY OF THE INVENTION

Various embodiments of the present invention are directed to systems, methods, and computer program products that determine a starting offset for a requesting peer device in a P2P network using a statistical function that takes into account buffer map information from neighboring peers. In one example, the peer device uses an averaging function that takes into account the play offsets of neighboring peers as well as the ages of buffer maps of those peers. The result of the averaging function is added to a pre-defined buffering time of the requesting peer to give at least a preliminary value for a starting offset. The preliminary value can be either accepted or recalculated, depending on whether certain conditions are met. When a final value for the starting offset is calculated, the final value is generally expected to be not so close to the playback position of the source peer that the requesting peer sends requests for streaming media to the source peer, nor so far behind that the user experiences an unacceptable time delay (assuming, of course, that there are a number of peers other than the source peer that can provide portions of the stream).

A given P2P network may include many peer devices using techniques according to embodiments of the invention to generate starting buffer offsets. One resulting advantage of some embodiments includes improved source peer functionality when many, or all, peers in a P2P network employ a technique to reduce requests to the source peer.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 2 is a conceptual representation of a buffer map, which may be used by peers in the conventional P2P network of FIG. 1;

DETAILED DESCRIPTION OF THE INVENTION

Figure 1:
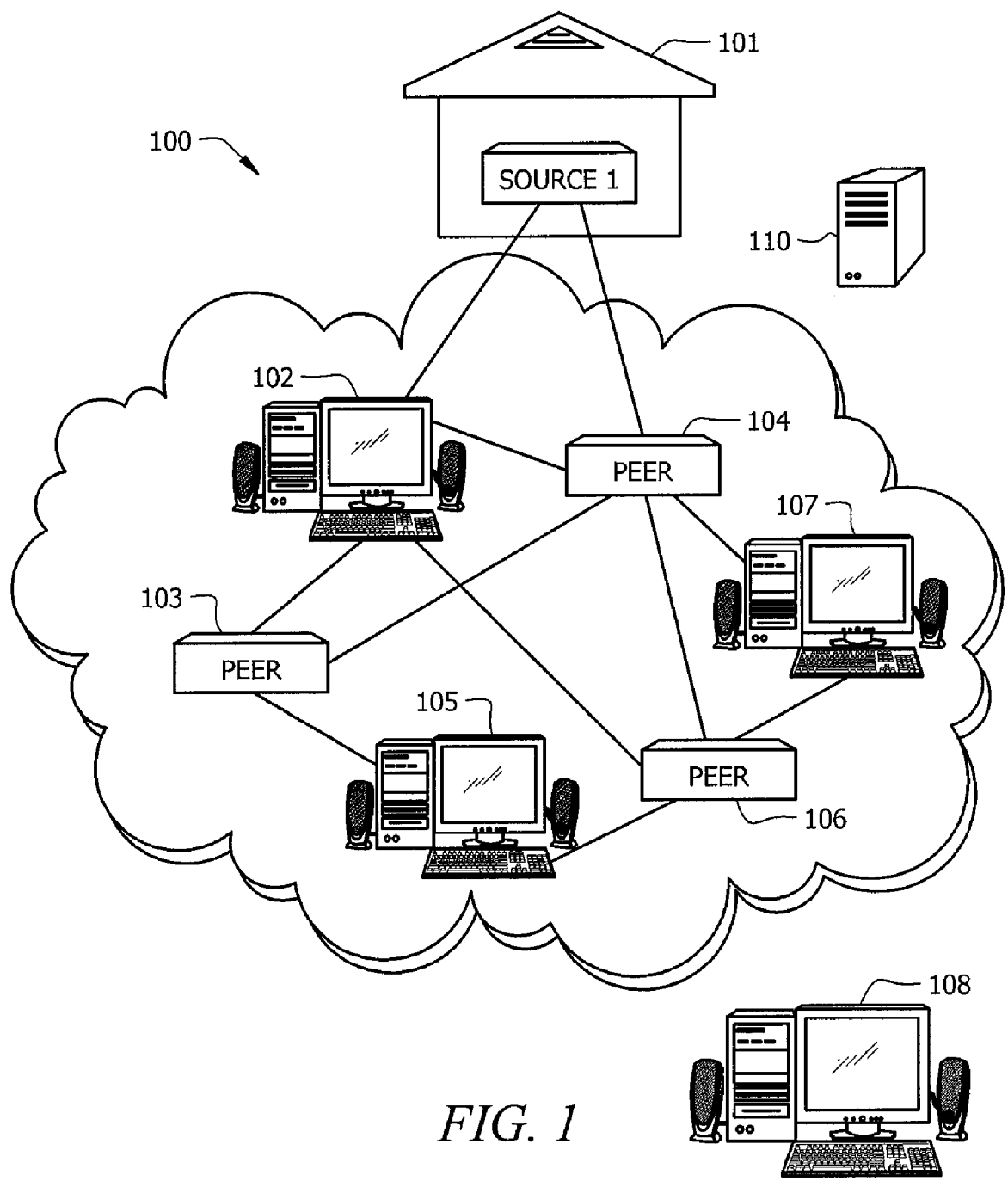
FIG. 1 is an illustration of a conventional P2P network.
Figure 3:
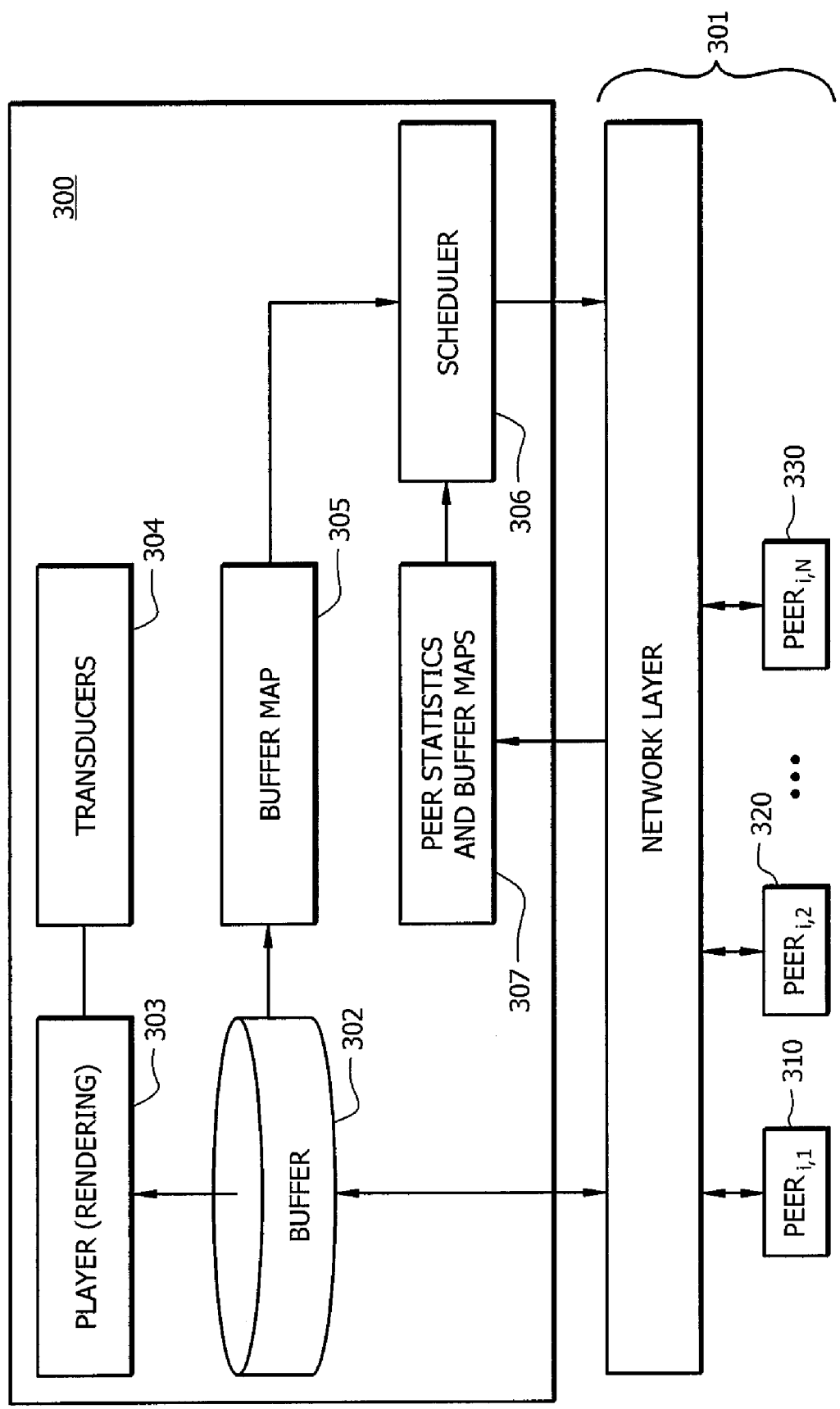
FIG. 3 is an illustration of an exemplary system diagram for a receiving peer, adapted according to an embodiment of the invention.

FIG. 3 is an illustration of exemplary peer device 300, adapted according to one embodiment of the invention. Exemplary peer device 300 is in communication with P2P network 301, which includes other peer devices 310, 320, and 330. The nomenclature used in this example refers to exemplary peer device 300 as $peer_i$, and peers 310, 320, 330 are neighboring peers where $peer_{ij}$ is the j'th peer in peer i's neighborhood.

Peers includes buffer 302, which stores received portions of streams (also called "chunks"). The chunks in buffer 302 are sent to player 303 (e.g., an MP3 player), which renders the streaming media upon transducers 304, which may include, e.g., speakers and a screen. The chunks in buffer 302 can also be sent to one or more neighboring peers in network 301. Still further, peer device 300 constructs its own buffer map 305, which is used by scheduler 306 to request missing chunks, and is sent to other peers in network 301. While not shown herein, it is understood that peer device 300 communicates with network 301 through any of a variety of wired or wireless means and includes inputs and outputs, such as antennas, RJ45 ports/connectors, modulators, demodulators, and the like.

Figure 2:
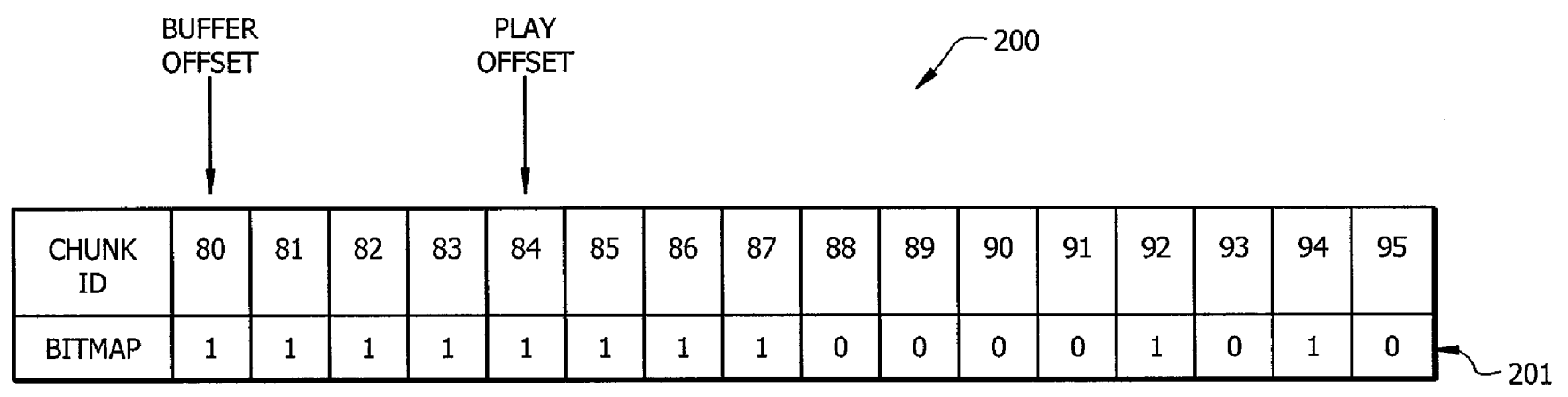

Peer device 300 receives peer statistics and buffer maps 307 from neighboring peers in network 301 (e.g., from peers 310, 320, 330). Peer statistics include, for example, number of hops to a given peer, network connection types and speeds, and the like. The buffer maps of this example can be the same or different from those shown and described above with respect to FIG. 2. Scheduler 306 uses the peer statistics and buffer maps 307 from neighboring peer devices to generate a starting offset according to embodiments of the invention. In this example, the starting offset that is generated is the beginning buffer offset for peer device 300, as well as the beginning play offset for peer device 300.

Figure 4:
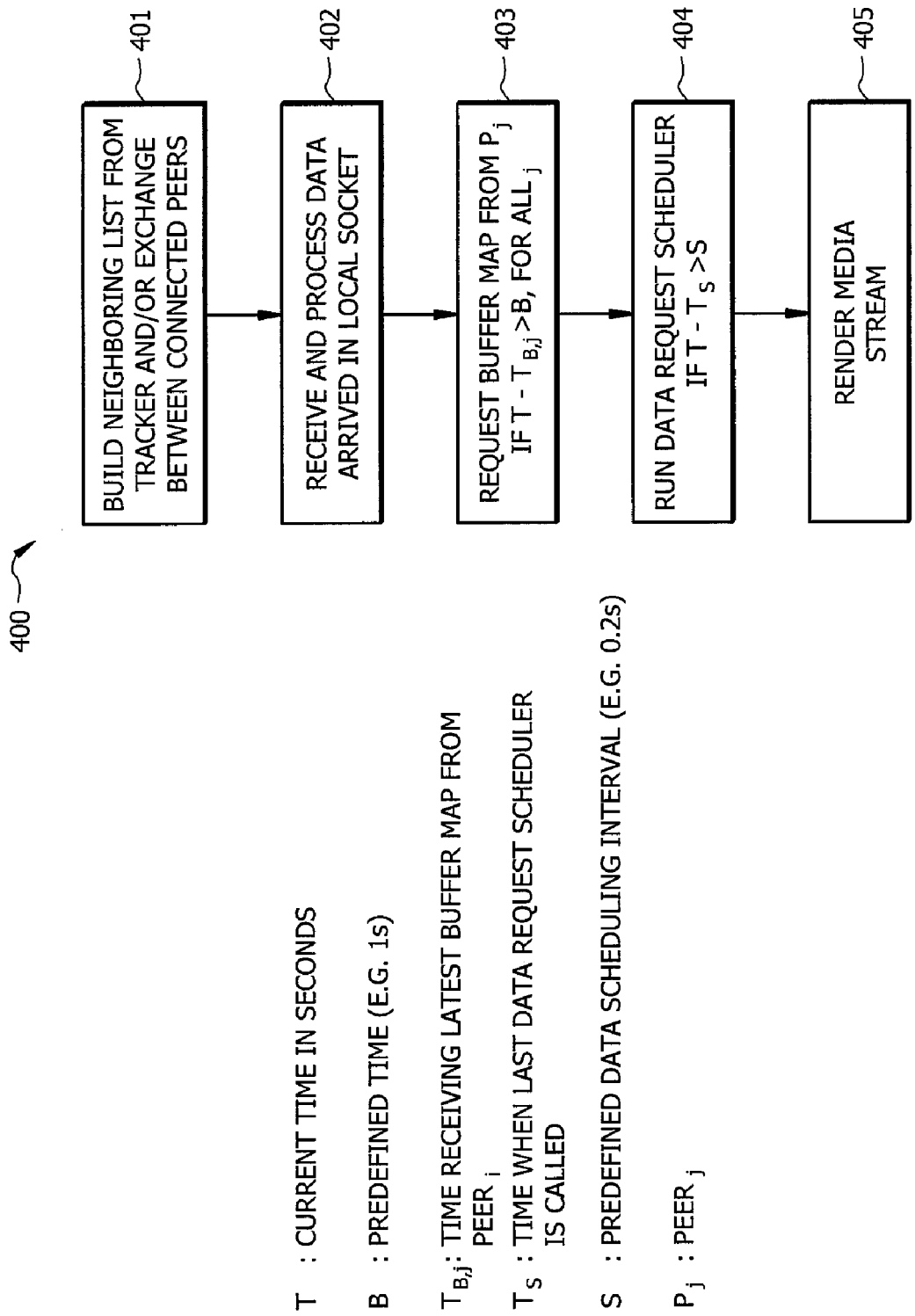
FIG. 4 is an illustration of an exemplary method, adapted according to one embodiment of the invention.

FIG. 4 is an illustration of exemplary method 400, adapted according to one embodiment of the invention. Method 400 is performed by a peer in a P2P network, such as peer device 300 of FIG. 3. In block 401, the peer builds a list of neighboring peers. The list can be obtained by consulting the tracker server, by requesting information from neighboring peers, and/or the like. In one example, the P2P network has a large number of peers viewing the same stream, e.g., ten thousand peers. When a peer joins the P2P network, it registers with the tracker server, which keeps a list of participating peers. In this example, which includes a very large number of peers, the tracker server returns only a percent of the peer list by some algorithm, for example, by randomly selecting forty peers for the requesting peer's list.

In block 402, the requesting peer receives and processes the data about neighboring peers. After block 402 is performed, the peer device has a list of neighboring peers from which it can request buffer maps. In block 403, a buffer map is requested from a given neighboring peer, $peer_j$, if the current time value minus the time value of the last buffer map from $peer_j$ is greater than a scheduling interval. In this example, block 403 is performed for all neighboring peers in the list, from j equals one to j equals N. In block 404, the scheduler is run to request chunks of the media stream if the current time value minus the time value of the last data request is greater than a predetermined scheduling interval. Block 404 takes into account the starting offset that is calculated by the requesting peer so that the requesting peer begins requesting the media stream at the calculated starting offset. In block 405, the peer device renders the media stream for the user.

Figure 5:
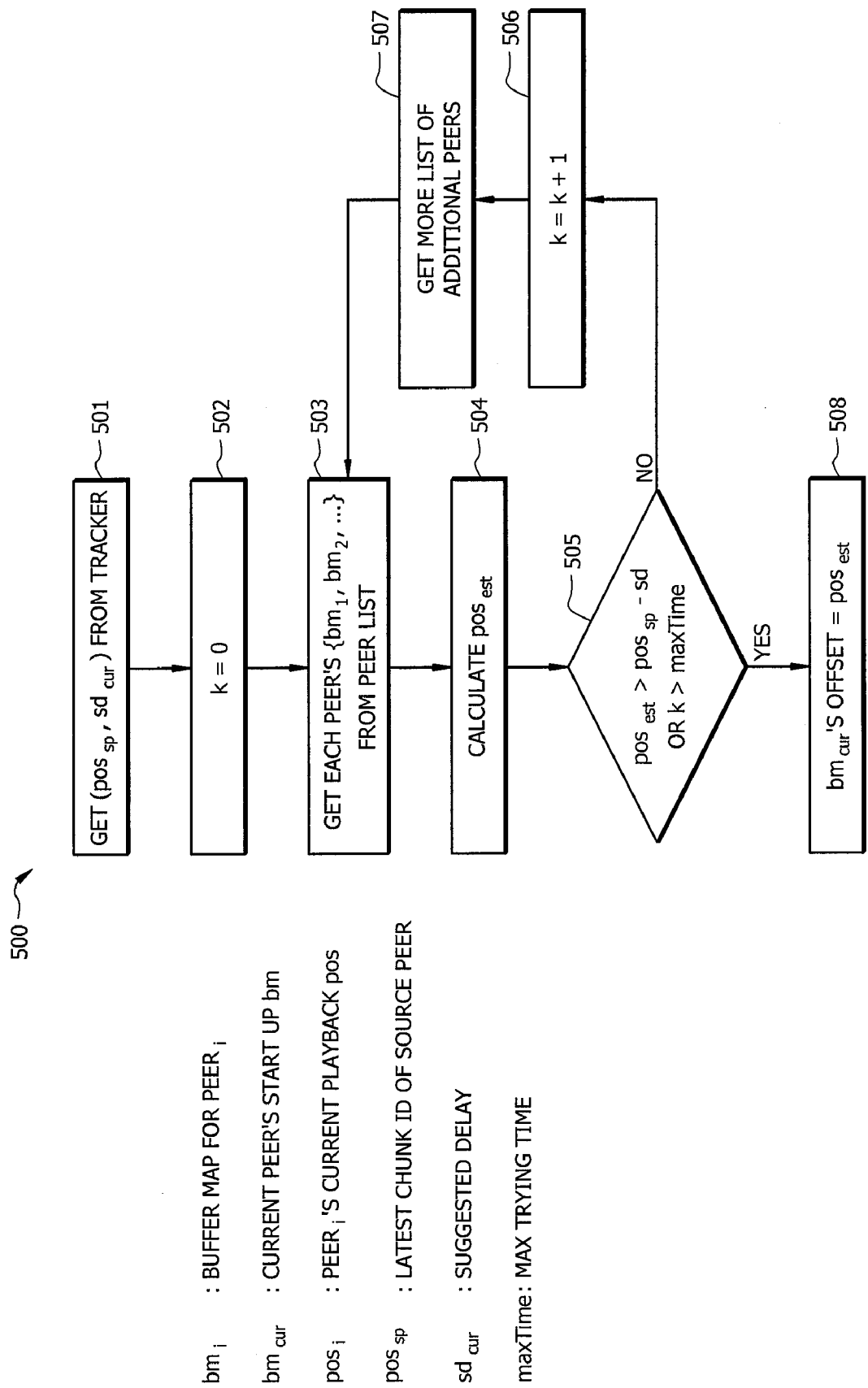
FIG. 5 is an illustration of an exemplary method adapted according to one embodiment of the invention.

FIG. 5 is an illustration of exemplary method 500 adapted according to one embodiment of the invention. FIG. 5 is performed by a peer in a P2P network, such as peer device 300 of FIG. 3, to generate a starting offset.

In block 501, the requesting peer gets the chunk identification of the latest chunk of the source peer and the suggested delay of the P2P network. Block 501 can be performed by requesting the information from the tracker server, but in some examples, can be performed by requesting the information from other peers. The suggested delay can be generated in any of a variety of ways. In one example, the suggested delay is simply a pre-defined value. In other examples, the suggested delay is dynamically generated by the tracker server or is randomly selected from a predefined range. The scope of embodiments is not limited to any specific technique for generating a suggested delay.

In block 502, the variable k is set to zero. In block 503, the requesting peer (also referred to as the "current peer") requests and receives buffer maps from each of its neighboring peers in the peer list. In block 504, an estimated position (i.e., a preliminary starting offset) value is calculated for the current peer. Block 504 is discussed in more detail with respect to FIG. 6.

In block 505, two conditions are encountered. The first condition is whether the estimated position value is greater than the latest chunk identification of the source peer minus the suggested delay. The second condition is whether k is greater than a defined maximum number of iterations of the loop. If either of the conditions are true, the estimated position is used as the current peer device's starting offset in block 508.

If both conditions are false, the variable k is incremented by one in block 506, and the current peer requests a list of additional peers in block 507. Blocks 503, 504, and 505 are then repeated for the additional peers. Thus, the loop in the flow diagram of FIG. 5 is repeated until one of the conditions in block 505 is true. Method 500 is exemplary, as modifications are possible in other embodiments. For example, if there are no additional peers such that a request for more peers at block 507 returns a negative result, then it is possible to go to block 508 without recalculating the estimated position value.

Figure 6:
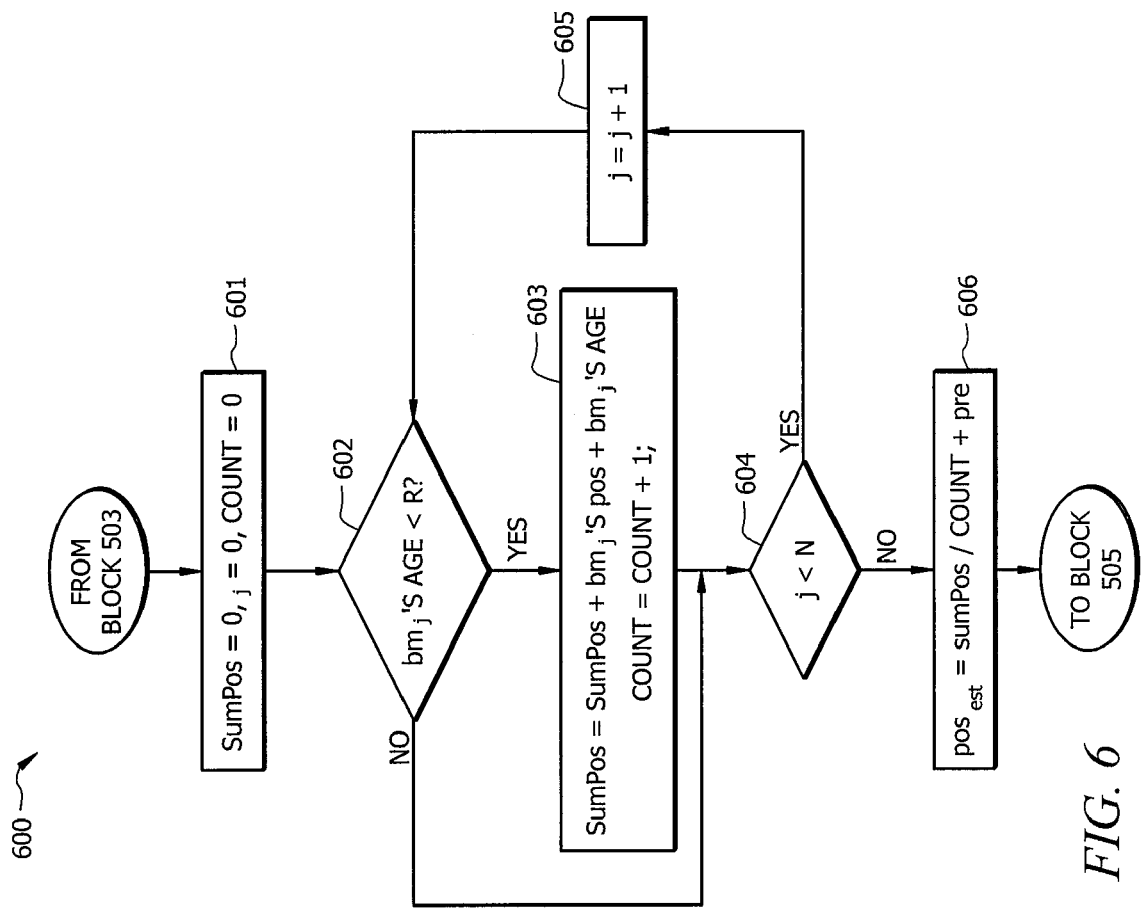
FIG. 6 is an illustration of an exemplary method adapted according to one embodiment of the invention.

FIG. 6 is an illustration of exemplary method 600 adapted according to one embodiment of the invention. FIG. 6 is performed by a peer in a P2P network, such as peer device 300 of FIG. 3, to calculate an estimated position value in block 504 of FIG. 5.

In block 601, the variables SumPos, j, and count are set to zero. As in FIG. 4, the variable j is associated with the number of neighboring peers.

In block 602, the buffer map of $peer_j$ is examined for its age. If the age of the buffer map is below a predefined threshold, method 600 continues on to block 603. If the buffer map is too old, then the variable j is incremented to that the buffer map of the next peer device is examined for age.

In block 603, the variable SumPos is increased to equal the immediately previous value of SumPos plus the playback position of $peer_j$ plus the age of the buffer map of $peer_j$. Adding the age of the buffer map to its respective playback position helps to compensate for the delay between the creation of the buffer map and the current time. Also, the count variable is incremented by one. In block 604, the value of j is compared to the total number of neighboring peer devices in the current peer's neighborhood. The loop at block 604 ensures that each neighboring peer's buffer map is considered. Once the buffer maps of all neighboring peer devices from zero to N are processed, the estimated position value is calculated to be a predefined buffering time of the current peer device plus the quotient of the variable SumPos over the variable count at block 606. The pre-defined buffering time of a device indicates the number of chunks that are buffered before the device begins playing. The pre-defined buffering time often depends on the capabilities of a given device, and is therefore usually device-specific.

Method 600 calculates the position estimate according to an averaging function that takes into account current play positions of neighboring peer devices as well as ages of the buffer maps from which the play positions are discerned. The position estimate is also adjusted by a value for the buffering time of the current peer device.

Methods 400, 500, 600 are exemplary, and the scope of embodiments is not limited to those particular methods. Various embodiments may add, omit, rearrange, and/or modify any of methods 400, 500, 600. For instance, the various variables and sizes of increments thereof are exemplary only. Furthermore, the number of repetitions for loops in methods 500 and 600 can be changed as desired for a particular application.

Additionally, statistical functions other than the averaging function described above can be employed in various embodiments. For example, other embodiments can employ a weighted averaging function, a mode function, and/or the like.

When implemented via computer-executable instructions, various elements of embodiments of the present invention are in essence the software code defining the operations of such various elements. The executable instructions or software code may be obtained from a readable medium (e.g., a hard drive media, optical media, RAM, EPROM, EEPROM, tape media, cartridge media, flash memory, ROM, memory stick, and/or the like). In fact, readable media can include any medium that can store information.

Figure 7:
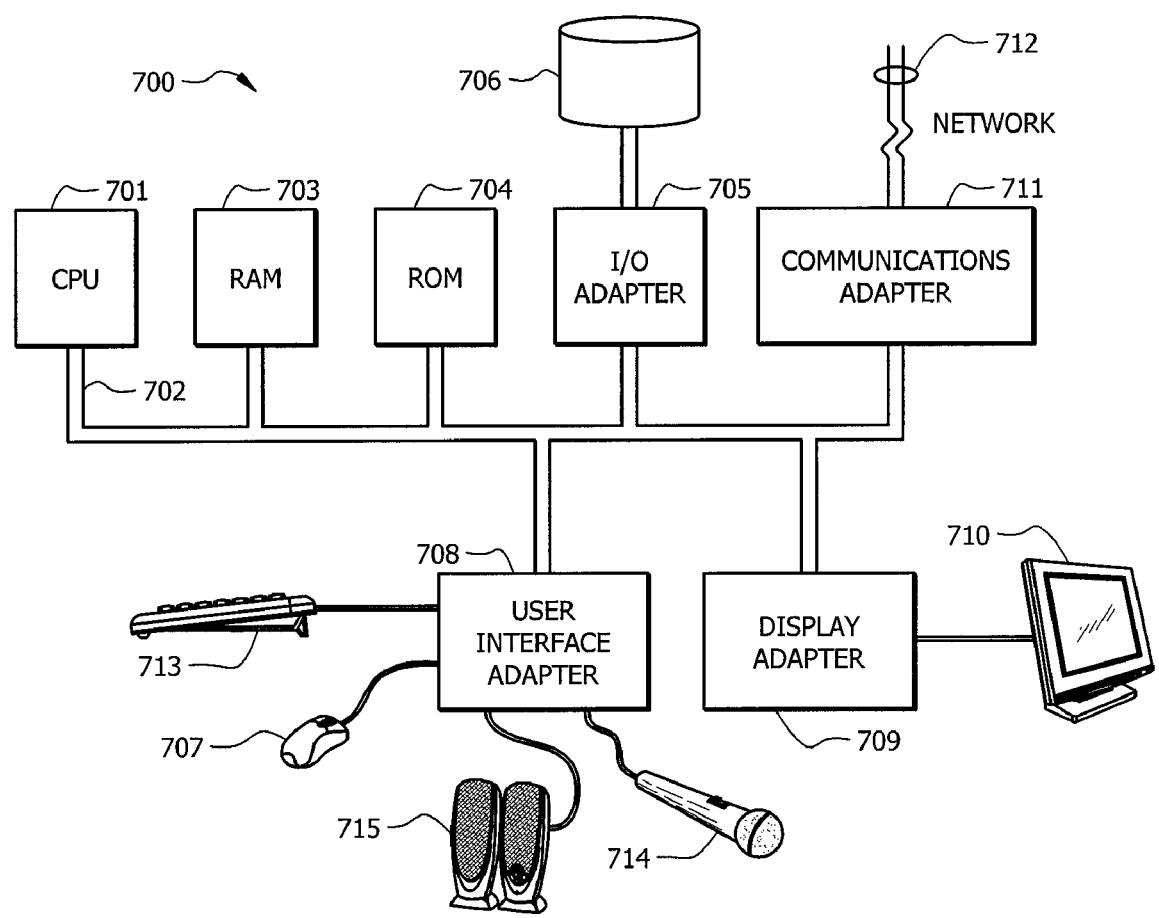
FIG. 7 is an illustration of an exemplary computer system, adapted according to an embodiment of the invention.

FIG. 7 illustrates an example computer system 700 adapted according to one embodiment of the present invention. That is, computer system 700 comprises an example system on which embodiments of the present invention may be implemented (such as peer device of the example implementation of FIG. 3). Central processing unit (CPU) 701 is coupled to system bus 702. CPU 701 may be any general purpose or specialized purpose CPU. However, the present invention is not restricted by the architecture of CPU 701 as long as CPU 701 supports the inventive operations as described herein. CPU 701 may execute the various logical instructions according to embodiments of the present invention. For example, one or more CPUs, such as CPU 701, may execute machine-level instructions according to the exemplary operational flows described above in conjunction with FIGS. 4, 5, and 6.

Computer system 700 also preferably includes random access memory (RAM) 703, which may be SRAM, DRAM, SDRAM, or the like. In this example, computer system 700 uses RAM 703 to buffer 302 of FIG. 3. Computer system 700 preferably includes read-only memory (ROM) 704 which may be PROM, EPROM, EEPROM, or the like. RAM 703 and ROM 704 hold user and system data and programs, as is well known in the art.

Computer system 700 also preferably includes input/output (I/O) adapter 705, communications adapter 711, user interface adapter 708, and display adapter 709. I/O adapter 705, user interface adapter 708, and/or communications adapter 711 may, in certain embodiments, enable a user to interact with computer system 700 in order to input information, such as media selections.

I/O adapter 705 preferably connects to storage device(s) 706, such as one or more of hard drive, compact disc (CD) drive, floppy disk drive, tape drive, etc. to computer system 700. The storage devices may be utilized when RAM 703 is insufficient for the memory requirements associated with storing media data. Communications adapter 711 is preferably adapted to couple computer system 700 to network 712 (e.g., the Internet, a LAN, a cellular network, etc.). User interface adapter 708 couples user input devices, such as keyboard 713, pointing device 707, and microphone 714 and/or output devices, such as speaker(s) 715 to computer system 700. Display adapter 709 is driven by CPU 701 to control the display on display device 710 to, for example, display the media as it is played.

While FIG. 7 shows a general-purpose computer, it should be noted that the exact configuration of a portion of a system according to various embodiments may be slightly different. For example, peer devices according to one or more embodiments may be any kind of processor-based device, such as a cell phone, a Personal Digital Assistant, a specialized device (e.g., a stand-alone P2P television module, or a Home Media Center available from Hong Kong Applied Science and Technology Research Institute Company Limited, that streams television content), a Set Top Box (STB—a P2P television module that receives television inputs, such as HDMI and component inputs and outputs to a television or other component), and/or the like. Additionally, servers (e.g., tracker servers) according to one or more embodiments may be any kind of processor-based device capable of sending media streams, such as a personal computer, a server-type computer, a STB, a Home Media Center, and the like. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A peer computing device in a peer-to-peer (P2P) network, the peer computing device comprising:
   an input receiving a plurality of buffer maps from a plurality of neighboring peers, each of said buffer maps indicating a current playback position of its respective neighboring peer;
   a memory storing said received plurality of buffer maps; and
   a processor determining a starting offset position for the peer computing device using at least a subset of said current playback positions and controlling streaming activities of said peer computing device according to said determined starting offset position.

2. The peer computing device of claim 1 wherein said processor applies a statistical function to said at least a subset of said current playback positions in determining said starting offset position.

3. The peer computing device of claim 2 wherein said statistical function comprises:
   an averaging function.

4. The peer computing device of claim 3 wherein said averaging function uses ages of ones of said buffer maps associated with said at least a subset of said current playback positions.

5. The peer computing device of claim 1 further comprising:
   a visual transducer and an audio transducer outputting a multimedia stream.

6. The peer computing device of claim 1 wherein said processor uses said starting offset position to schedule requests for media stream portions.

7. The peer computing device of claim 1 wherein said processor uses said starting offset position to identify a media stream portion to be requested first.

8. The peer computing device of claim 1 comprising an item selected from the list consisting of:
   a P2P television module;
   a personal computer, cell phone;
   a personal digital assistant (PDA);
   a home media center; and
   a set-top box (STB).

9. The peer computing device of claim 1 wherein said processor generates a buffer map of said peer computing device and sends said buffer map of said peer computing device to one or more of said neighboring peers.

10. A method performed by a first peer device in a peer-to-peer (P2P) network, said P2P network including a plurality of other peer devices, said method comprising:
    receiving a plurality of buffer maps, each of said received buffer maps associated with a respective one of said other peer devices in said P2P network;
    discerning playback positions associated with said other peer devices;
    generating a starting offset for the first peer using a plurality of the discerned playback positions;
    in accordance with said starting offset, scheduling requests for portions of a media stream; and
    rendering said media stream on one or more transducers.

11. The method of claim 10 further comprising:
    buffering received portions of said media stream beginning at said starting offset.

12. The method of claim 10 wherein generating said starting offset comprises:
    iteratively calculating a first value using said plurality of discerned playback positions and ages of the one or more of the received buffer maps.

13. The method of claim 12 further comprising:
    calculating a second value using said first value and a predefined buffering time of said first peer;
    comparing said second value to a condition; and
    performing an operation selected from the list consisting of:
      setting said starting offset equal to said second value when said second value satisfies said condition; and
      recalculating said first and second values using additional received buffer maps from additional respective other peer devices in said P2P network when said second value does not satisfy said condition.

14. The method of claim 10 wherein said media stream comprises consecutively numbered chunks.

15. The method of claim 14 wherein each of said buffer maps indicate a starting offset, a playback offset, and a bitmap, the bitmap indicating chunks buffered.

16. A computer program product having a computer readable non-transitory medium having computer program logic recorded thereon, said computer program product comprising:
    code for receiving a plurality of buffer maps from a plurality of peer devices in a peer-to-peer (P2P) network, each of said buffer maps indicating a playback offset;
    code for calculating a starting offset for a first peer device using a statistical function that has as inputs at least a portion of said playback offsets from said buffer maps; and
    code for scheduling media requests beginning at said starting offset.

17. The computer program product of claim 16 comprising:
    code for requesting portions of a stream that is shared among said plurality of peer devices and said first peer device.

18. The computer program product of claim 17, wherein said code for scheduling media requests comprises code for scheduling requests for chunks of media data, said scheduling performed using said plurality of buffer maps of said plurality of peer devices.

19. The computer program product of claim 17 wherein said statistical function comprises an averaging function.

20. The computer program product of claim 17 wherein said statistical function comprises an averaging function and the inputs of said averaging function comprise:
    said at least a portion of said playback offsets from said buffer maps; and
    ages of at least a portion of said buffer maps.

* * * * *